US012447474B2

(12) United States Patent
Morimoto et al.

(10) Patent No.: US 12,447,474 B2
(45) Date of Patent: Oct. 21, 2025

(54) ROTARY PROCESSING DEVICE

(71) Applicant: JDC Corporation, Tokyo (JP)

(72) Inventors: Hidetoshi Morimoto, Tokyo (JP); Yuu Sato, Tokyo (JP); Shingo Mizutani, Tokyo (JP)

(73) Assignee: JDC Corporation, Tokyo (JP)

( * ) Notice: Subject to any disclaimer, the term of this patent is extended or adjusted under 35 U.S.C. 154(b) by 319 days.

(21) Appl. No.: 17/923,808

(22) PCT Filed: Jun. 4, 2021

(86) PCT No.: PCT/JP2021/021356
§ 371 (c)(1),
(2) Date: Nov. 7, 2022

(87) PCT Pub. No.: WO2021/261217
PCT Pub. Date: Dec. 30, 2021

(65) Prior Publication Data

US 2023/0166268 A1 Jun. 1, 2023

(30) Foreign Application Priority Data

Jun. 24, 2020 (JP) ................................ 2020-109022

(51) Int. Cl.
*B02C 13/288* (2006.01)
*B01F 35/00* (2022.01)
(Continued)

(52) U.S. Cl.
CPC .......... *B02C 13/288* (2013.01); *B01F 35/181* (2022.01); *B02C 13/16* (2013.01); *B02C 13/30* (2013.01); *B01F 23/803* (2022.01)

(58) Field of Classification Search
CPC ....... B02C 13/16; B02C 13/288; B02C 13/30; B01F 23/803; B01F 35/181; B01F 35/184;
(Continued)

(56) References Cited

U.S. PATENT DOCUMENTS 2,350,737 A * 6/1944 Eiben ...................... B07B 4/025 241/61
5,732,894 A * 3/1998 Sheahan ............... B02C 13/288 241/162
(Continued)

FOREIGN PATENT DOCUMENTS

JP 11188278 A * 7/1999
JP 2012-016698 A 1/2012
(Continued)

*Primary Examiner* — Jared O Brown
(74) *Attorney, Agent, or Firm* — Young Basile Hanlon & MacFarlane, P.C.

(57) ABSTRACT

A rotary processing device that processes a processing object inside a drum and suppresses scattering of particles is described. The rotary processing device includes a drum including a feeding unit for the processing object on one side and a discharge unit for the processing object on the other side and a processor that is connected to a rotation axis member, rotates about a rotation axis of the rotation axis member, and processes the processing object in the drum. The rotary processing device also includes a suppressor that suppresses a gas flow from the other side toward the one side in the drum.

20 Claims, 12 Drawing Sheets

(51) Int. Cl.

| | |
|---|---|
| ***B02C 13/16*** | (2006.01) |
| ***B02C 13/30*** | (2006.01) |
| *B01F 23/80* | (2022.01) |

(58) Field of Classification Search
CPC . B01F 35/186; B01F 35/189; B01F 35/75475
See application file for complete search history.

(56) References Cited

U.S. PATENT DOCUMENTS

| | | | | | |
|---|---|---|---|---|---|
| 7,077,348 | B2 * | 7/2006 | Johnson | B02C 13/1835 241/85 |
| 2016/0228879 | A1 * | 8/2016 | Scharfe | B02C 13/14 |
| 2017/0100754 | A1 * | 4/2017 | Nelson | B02C 13/2804 |
| 2020/0129986 | A1 * | 4/2020 | Gronholz | B02C 13/16 |
| 2024/0058823 | A1 * | 2/2024 | Scharfe | B02C 13/16 |

FOREIGN PATENT DOCUMENTS

| | | | | | |
|---|---|---|---|---|---|
| JP | 2012-120956 | A | | 6/2012 | |
| JP | 2013-096053 | A | | 5/2013 | |
| JP | 2013-104248 | A | | 5/2013 | |
| JP | 2014-074321 | A | | 4/2014 | |
| JP | 7137025 | B2 | | 9/2022 | |
| KR | 101785217 | B1 | | 11/2017 | |
| WO | WO-2013167398 | A1 | * | 11/2013 | B02C 13/16 |
| WO | WO-2016116029 | A1 | * | 7/2016 | B02C 13/14 |
| WO | WO-2019016859 | A1 | * | 1/2019 | B01F 7/16 |
| WO | 2021/145010 | A1 | | 7/2021 | |

* cited by examiner

ROTARY PROCESSING DEVICE

TECHNICAL FIELD

The present invention relates to a rotary processing device.

BACKGROUND

Conventionally, a soil reclaimer in which a dust collector is disposed on a discharge conveyor that discharges raw material soil and a soil conditioner kneaded in a crushing unit is known (for example, refer to JP Patent Publication No. 2014-074321 A).

SUMMARY

Incidentally, the treatment of raw material soil such as construction-generated soil may be performed by a rotary processing device including a cylindrical drum. The drum may include a feeding unit for a processing object on one side, a discharge unit for a processing object on the other side, and a processing member connected to the rotation axis member inside. The rotary processing device rotates the processing member in the drum to crush or knead the processing object. When a processing object is processed using such a drum, particles derived from the processing object may fly up in the drum. The particles flying up in the drum are desirably processed so that they do not scatter to the outside. The soil reclaimer disclosed in JP Patent Publication No. 2014-074321 A does not include such a drum, and processing of particles flying up or scattering in the drum is not assumed. Therefore, it is assumed that there are cases in which the dust collector included in the soil reclaimer disclosed in JP Patent Publication No. 2014-074321 A cannot be applied to a rotary processing device using a drum.

Therefore, an object of the present invention is to suppress scattering of particles in a rotary processing device that processes a processing object inside a drum.

A rotary processing device according to the present specification includes: a drum including a feeding unit for a processing object on one side and a discharge unit for a processing object on the other side; a processor (also called a processing member herein) that is connected to the rotation axis member, rotates about a rotation axis of the rotation axis member, and processes the processing object in the drum; and a suppressor (also called a suppression unit herein) that suppresses a gas flow from the other side toward the one side in the drum.

According to the present invention, it is possible to suppress scattering of particles in a rotary processing device that processes a processing object inside a drum.

DETAILED DESCRIPTION

Figure 1:
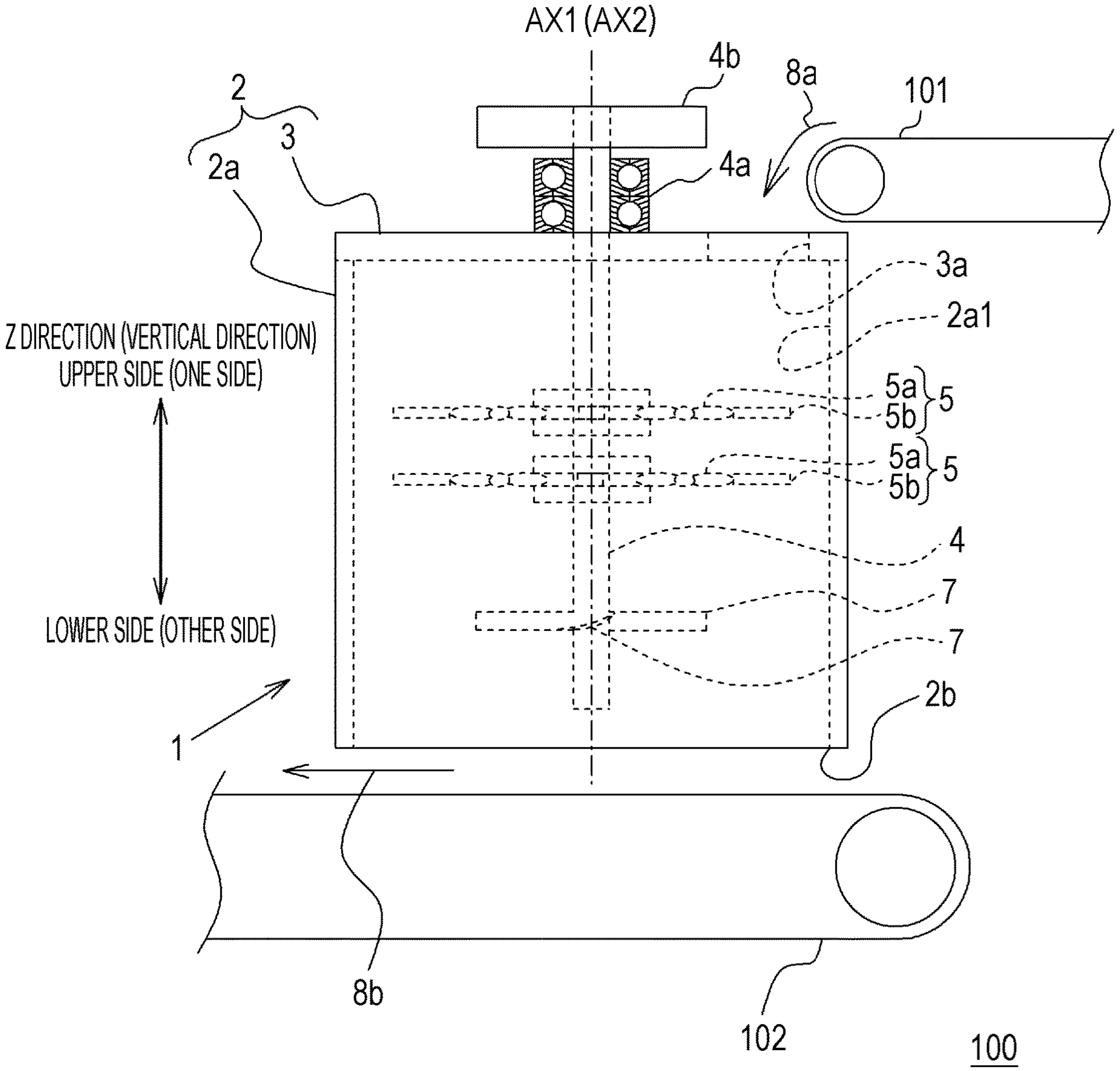
FIG. 1 is an explanatory view illustrating a part of a mixing device including a rotary processing device according to a first embodiment.

Hereinafter, embodiments will be described with reference to the drawings. Note that, in the drawings, dimensions, ratios, and the like of each unit may not be illustrated to completely coincide with actual ones. In addition, details may be omitted depending on the drawings. In the following description, a direction coinciding with the vertical direction as illustrated in FIG. 1 and other drawings is referred to as a Z direction.

First Embodiment

First, a mixing device 100 including a rotary processing device (hereinafter, simply referred to as a "processing device") 1 of a first embodiment will be described with reference to FIG. 1. FIG. 1 illustrates a part of the mixing device 100.

The mixing device 100 includes a processing device 1 that performs processing of raw material soil to improve and effectively use the raw material soil such as construction-generated soil. The processing device 1 performs processing of finely and homogeneously dispersing the raw material soil by crushing and granulating the raw material soil. In addition, the processing device 1 performs mixing and kneading of the raw material soil and the additive as necessary to obtain improved soil. The additive is lime-based solidifying materials such as quicklime and slaked lime, cementitious solidifying materials such as ordinary cement and blast furnace cement, soil-improving materials made of polymer materials, natural fibers, and chemical fibers made of resin, and is fed at a desired ratio with respect to the raw material soil. As a result, the properties, strength, and the like of the reformed soil are adjusted. In the present embodiment, because the raw material soil and the additive are mixed in the processing device 1, the raw material soil and the additive are processing objects. However, there is a case where no additive is fed, and in this case, the raw material soil is a processing object.

The mixing device 100 includes a feeding conveyor 101 and a discharge conveyor 102. The feeding conveyor 101 feeds the raw material soil and the additive before being mixed into the processing device 1 as indicated by an arrow 8*a*. The discharge conveyor 102 conveys the reformed soil generated by processing the processing object in the processing device 1 and discharged from the processing device 1 as indicated by an arrow 8*b*. The mixing device 100 includes various components in addition to the feeding conveyor 101 and the discharge conveyor 102. For example, a raw material soil hopper for feeding the raw material soil onto the feeding conveyor 101, an additive hopper for feeding the additive onto the feeding conveyor 101, and the like are provided, but these are omitted in FIG. 1.

Figure 2:
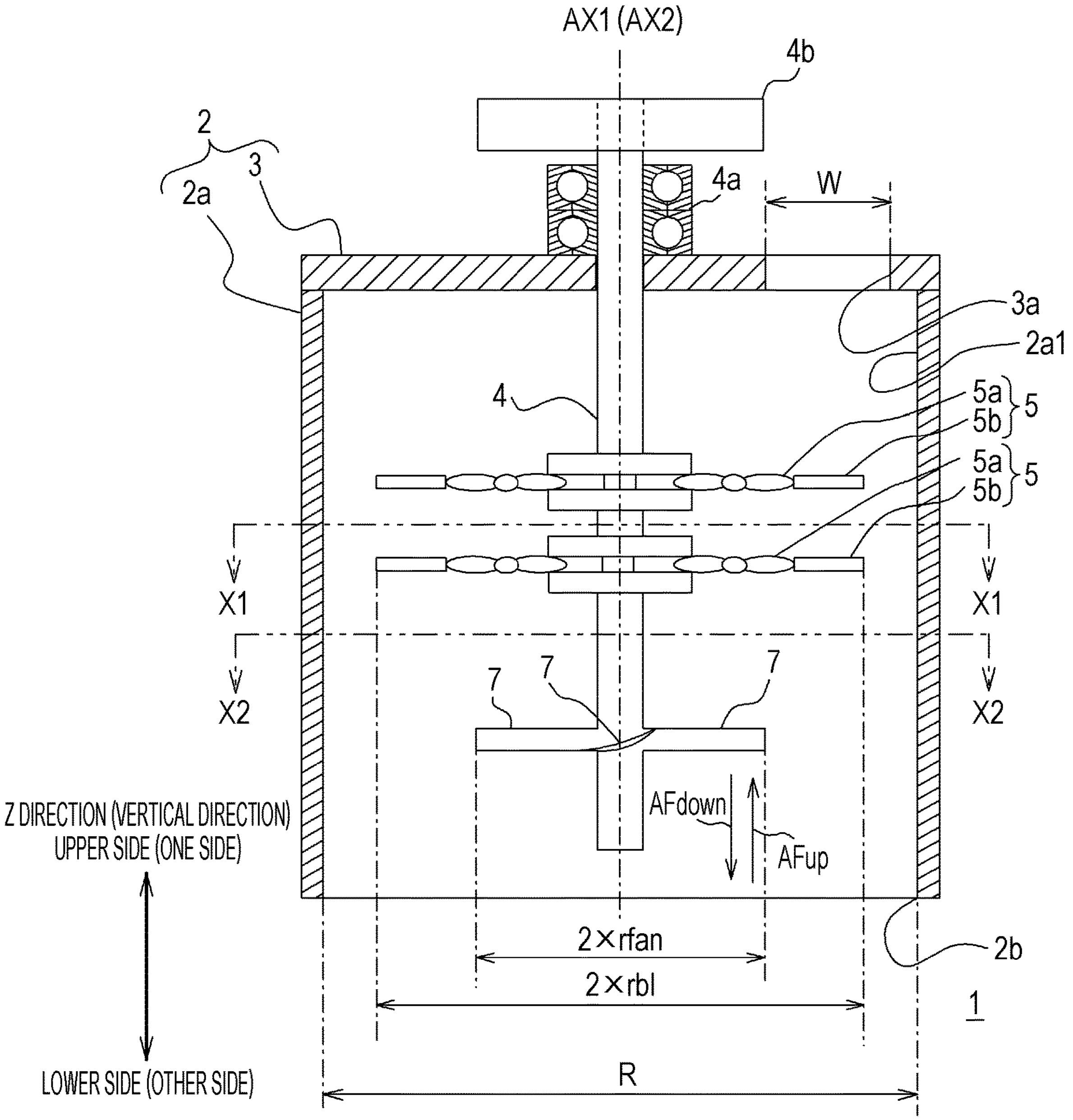
FIG. 2 is a sectional view of the rotary processing device according to the first embodiment.

Next, the processing device 1 will be described. Referring to FIG. 2 illustrating a cross section of the processing device 1, the processing device 1 includes a drum 2, a rotation axis member 4, an impact member 5 as a processing member, and a blade portion 7.

The drum 2 includes a cylindrical portion 2*a*. The cylindrical portion 2*a* is disposed such that a center axial line AX1 thereof extends in the Z direction. However, the cylindrical portion 2*a* does not necessarily have to be arranged with the center axial line AX1 thereof in the Z direction, and the cylindrical portion 2*a* may be arranged in a state of being inclined with respect to the Z direction (vertical direction). A top plate portion 3 is provided at one end portion of the cylindrical portion 2*a*, that is, an upper end portion in the present embodiment. The top plate portion 3 is provided with a feeding unit 3*a* for feeding the raw material soil and the additive, which are processing objects, into the cylindrical portion 2*a*. In addition, the other end portion of the cylindrical portion 2*a*, in the present embodiment, the lower end portion is an open end, and is a discharge unit 2*b* from which the improved soil generated by processing in the cylindrical portion 2*a* is discharged. Even when the cylindrical portion 2*a* is provided to be inclined with respect to the Z direction, an aspect is adopted in which the feeding unit 3*a* is provided at one part of the cylindrical portion 2*a* and the discharge unit 2*b* is provided at the other part of the cylindrical portion 2*a*.

Figure 3:
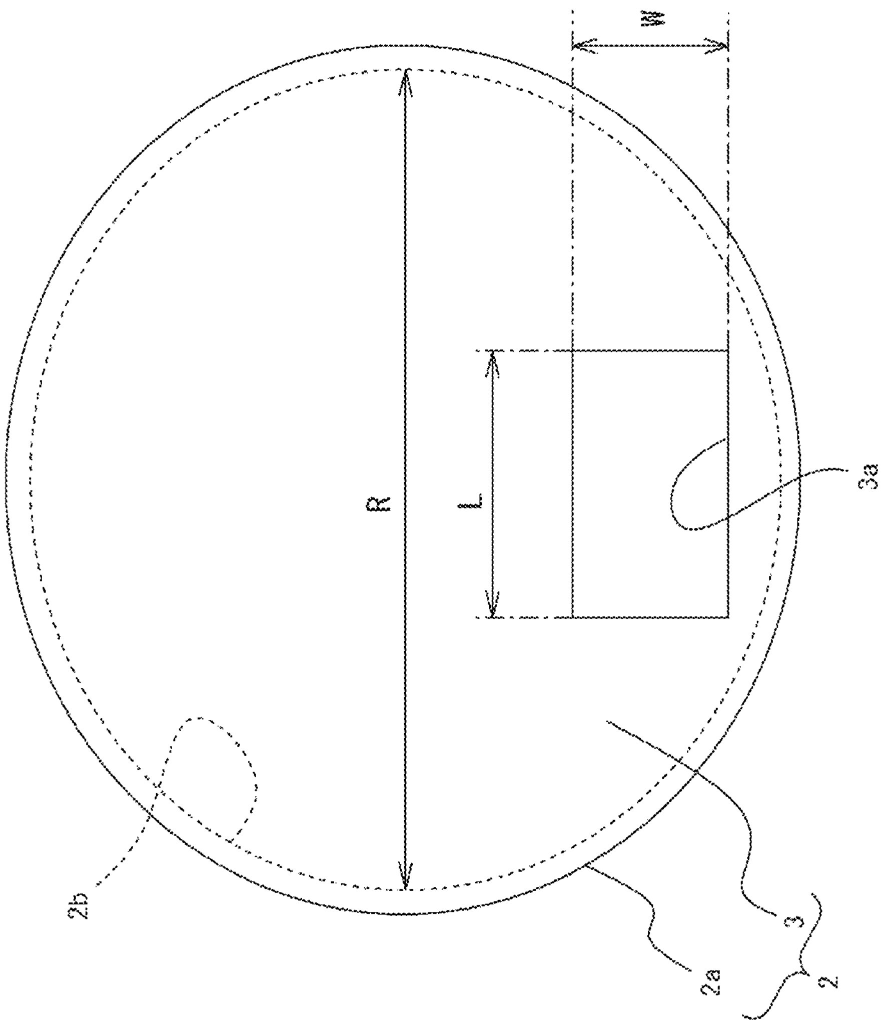
FIG. 3 is an explanatory view illustrating a dimension of a feeding unit and a dimension of a discharge unit for a processing object in a drum included in the rotary processing device according to the first embodiment.

Here, the dimension of the feeding unit 3*a* and the dimension of the discharge unit 2*b* will be described with reference to FIG. 3. The feeding unit 3*a* in the present embodiment has a rectangular shape, and a longitudinal dimension L and a lateral dimension W can be appropriately set in a range of approximately 550 mm to 800 mm. On the other hand, the discharge unit 2*b* is a circular opening portion, and a diameter R thereof can be appropriately set within a range of approximately 1500 mm to 2250 mm. Therefore, when the area of the feeding unit 3*a* is compared with the area of the discharge unit 2*b*, the area of the discharge unit 2*b* is larger than the area of the feeding unit 3*a*. For example, even when both the longitudinal dimension L and the lateral dimension W of the feeding unit 3*a* are set to 800 mm, which is the maximum, and the diameter R of the discharge unit 2*b* is set to 1500 mm, which is the minimum, the area of the discharge unit 2*b* is larger than the area of the feeding unit 3*a*. Such a relationship between the area of the feeding unit 3*a* and the area of the discharge unit 2*b* is considered to affect the flow of gas in the drum 2 when the processing device 1 is in operation. The influence of the flow of the gas in the drum 2 will be described in detail later. The diameter R of the discharge unit 2*b* can be narrowed to a desired dimension by narrowing the lower end portion of the cylindrical portion 2*a* in a funnel shape.

Referring again to FIG. 2, the rotation axis member 4 penetrates the top plate portion 3, and the rotation axis member 4 is provided such that an upper part (one) is positioned above the top plate portion 3 and a lower part (the other) is positioned in the cylindrical portion 2*a*. A rotation axis AX2 of the rotation axis member 4 extends in the Z direction similarly to the center axial line AX1 of the cylindrical portion 2*a*. In the present embodiment, the center axial line AX1 of the cylindrical portion 2*a* coincides with the rotation axis AX2 of the rotation axis member 4, but the center axial line AX1 of the cylindrical portion 2*a* and the rotation axis AX2 of the rotation axis member 4 do not necessarily coincide with each other. Further, the rotation axis AX2 is not necessarily disposed in the Z direction, and the rotation axis AX2 may be disposed in a state of being inclined with respect to the Z direction (vertical direction).

The rotation axis member 4 is rotatably supported around the rotation axis AX2 by a bearing member 4*a* provided on the top plate portion 3. The lower end portion of the rotation axis member 4 is positioned inside the drum 2 and is a free end. That is, the rotation axis member 4 is supported (e.g., is held by the drum 2) in a cantilever manner. A driving pulley 4*b* is provided at an upper (one) end portion of the rotation axis member 4. A driving belt (not illustrated) is stretched on the driving pulley 4*b*. The driving belt transmits rotation of a driving motor (not illustrated) to the driving pulley 4*b* to rotate the rotation axis member 4.

The applicant of the present application has also proposed a rotary crushing device having a cantilever ball bearing in Japanese Patent Application No. 2020-004183 filed on Jan. 15, 2020.

Also in the present embodiment, a ball bearing can be adopted as the bearing member 4*a*, and an angular ball bearing can be adopted to improve the rotation accuracy and the rigidity of the rotation axis member 4. In this manner, the rotation axis member 4 is supported in a cantilever manner on the upper side of the rotation axis member 4, and the lower side (the other end side) of the rotation axis member 4 is a free end, and thus there will be an available space for disposing the bearing member on the lower side of the rotation axis member 4. Therefore, in the present embodiment, the total height of the drum 2, that is, the total height of the processing device 1 can be lowered. In addition, the mounting position of the processing device 1 in the mixing device 100 can be lowered. Accordingly, the peripheral devices can also be installed at a low position, and the total height of the mixing device 100 as a whole can be reduced. The mixing device 100 can be installed, for example, on a traveling device, but can have an overall height of 3.8 m or less in a state of being installed on the traveling device, can clear a conveyance height of 3.8 m, which is a guide of a height at the time of transportation, and can ensure a degree of freedom of conveyance of the mixing device 100 by a truck or a trailer.

Figure 4:
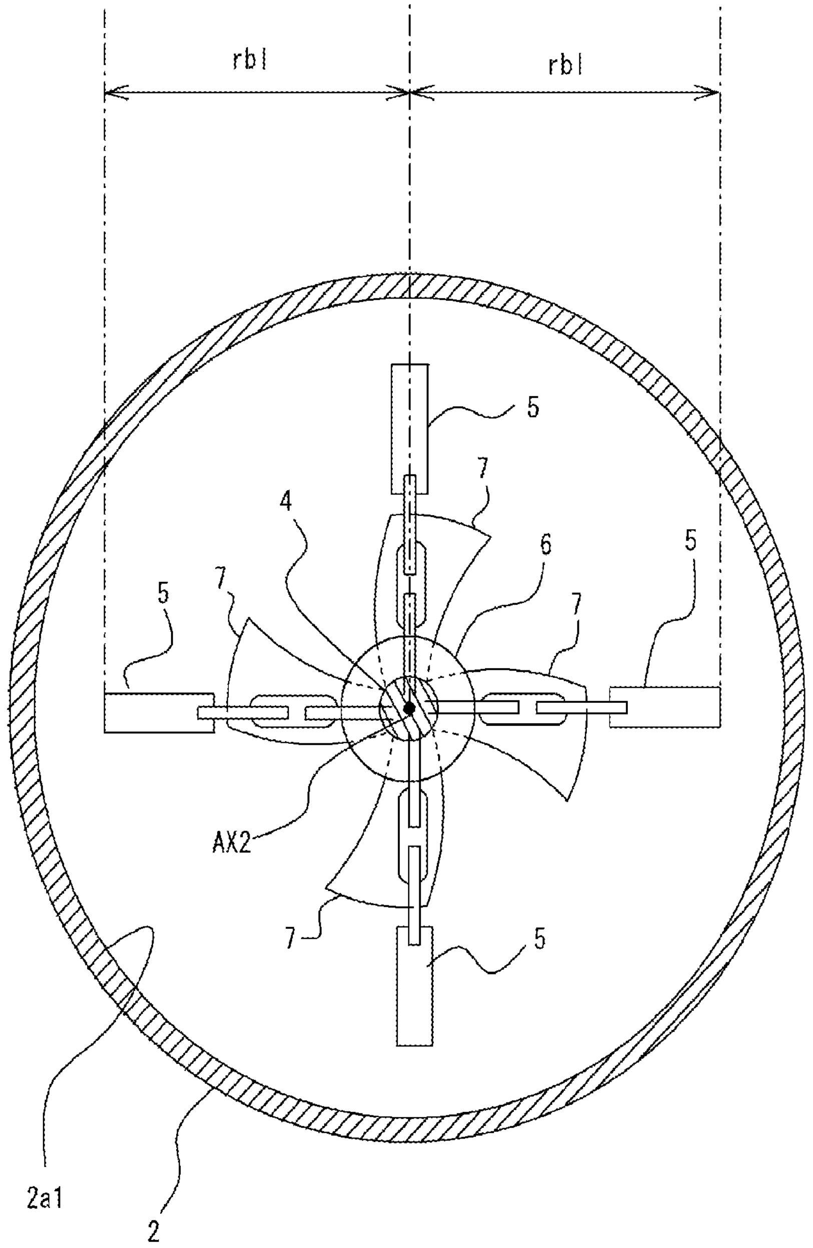
FIG. 4 is a sectional view taken along line X1-X1 in FIG. 2 of the rotary processing device according to the first embodiment.

The rotation axis member 4 is provided with the impact member 5 as a processing member. The impact member 5 includes a metal chain 5*a* connected to the rotation axis member 4 and a steel thick plate 5*b* provided on the tip end side thereof. The impact member 5 crushes and granules the raw material soil in the drum 2 to finely and homogeneously disperse the raw material soil. In addition, the impact member 5 mixes the raw material soil and the additive. Referring to FIG. 4, four impact members 5 are provided in the cylindrical portion 2*a* of the drum 2 at 90° intervals. The length from the rotation axis AX2 to the tip end portion of each impact member 5 is rbl, and the diameter of the trajectory drawn by the tip end portion of the impact member 5 is 2×rbl.

In the cylindrical portion 2*a*, the number of stages of the impact member 5 in the Z direction is two as illustrated in FIG. 2, but the number of stages is not limited thereto, and may be, for example, one stage or three or more stages. In addition, for example, a blade-shaped member may be used instead of the impact member 5 in which the chain 5*a* and the thick plate 5*b* are combined.

Figure 5:
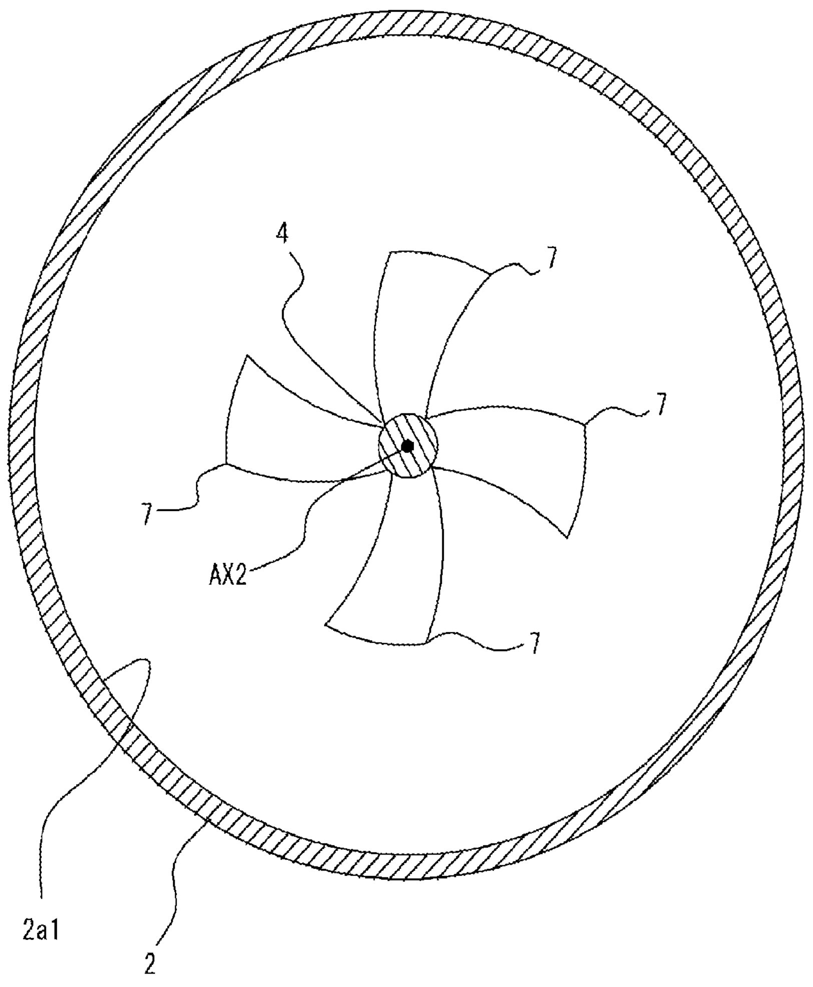
FIG. 5 is a sectional view taken along line X2-X2 in FIG. 2 of the rotary processing device according to the first embodiment.

As illustrated in FIGS. 2, 4, and 5, the rotation axis member 4 is provided with four blade portions 7 that function as suppression units that suppress a gas flow from the lower side (the other side) to the upper side (the one side) in the drum 2, that is, an upward flow AFup. The blade portion 7 has a curved shape, and functions as a fan that generates a gas flow in a desired direction when the rotation axis member 4 rotates. The number of blade portions 7 is not limited to four, and the number can be appropriately selected. The shape of the blade portion 7 can also be appropriately set. It is preferable to use a metal material such as iron (for example, cast iron) or stainless steel because the raw material soil or the like pulverized by the impact member 5 hits the blade portion 7.

Referring to FIG. 5, four blade portions 7 are provided in an inner peripheral wall 2*a*1 of the drum 2 at 90° intervals. Referring to FIG. 2, the blade portion 7 is connected to the rotation axis member 4 below the impact member 5. The reason why the blade portion 7 is connected to the rotation axis member 4 below the impact member 5 is that raw material soil, an additive, and the like fed from above easily collide with the impact member 5. That is, when the blade portion 7 is connected to the rotation axis member 4 above the impact member 5, the raw material soil or the like collides with the blade portion 7 before the impact member 5, and the function of the impact member 5 is difficult to be exerted, which is avoided.

The length from the rotation axis AX2 of the blade portion 7 to the radially outer end is rfan, and the diameter of the trajectory drawn by the tip end portion of the blade portion 7 is 2×rfan. Here, referring to FIG. 2, the diameter 2×rfan of the trajectory drawn by the tip end portion of the blade portion 7 is smaller than the diameter 2×rbl of the trajectory drawn by the tip end portion of the impact member 5. This is to prevent the blade portion 7 from hindering the smooth falling of the raw material soil or the like processed by the impact member 5 as much as possible.

When the rotation axis member 4 rotates, the blade portion 7 generates a downward gas flow illustrated in FIG. 2, that is, a downward flow AFdown. Because the downward flow AFdown is a flow facing the upward flow AFup, the upward flow AFup can be suppressed. In addition, because the lower side (the other end side) of the rotation axis member 4 is the free end, the size of the blade portion 7 can be increased as compared with the case where the bearing member is provided on the lower side (the other end side) of the rotation axis member 4, and the restriction on the shape is also reduced, and scattering of particles can be efficiently suppressed. Because the degree of freedom of the installation position of the blade portion 7 in the Z direction is also increased, the blade portion 7 can be provided at an optimum position.

Figure 6:
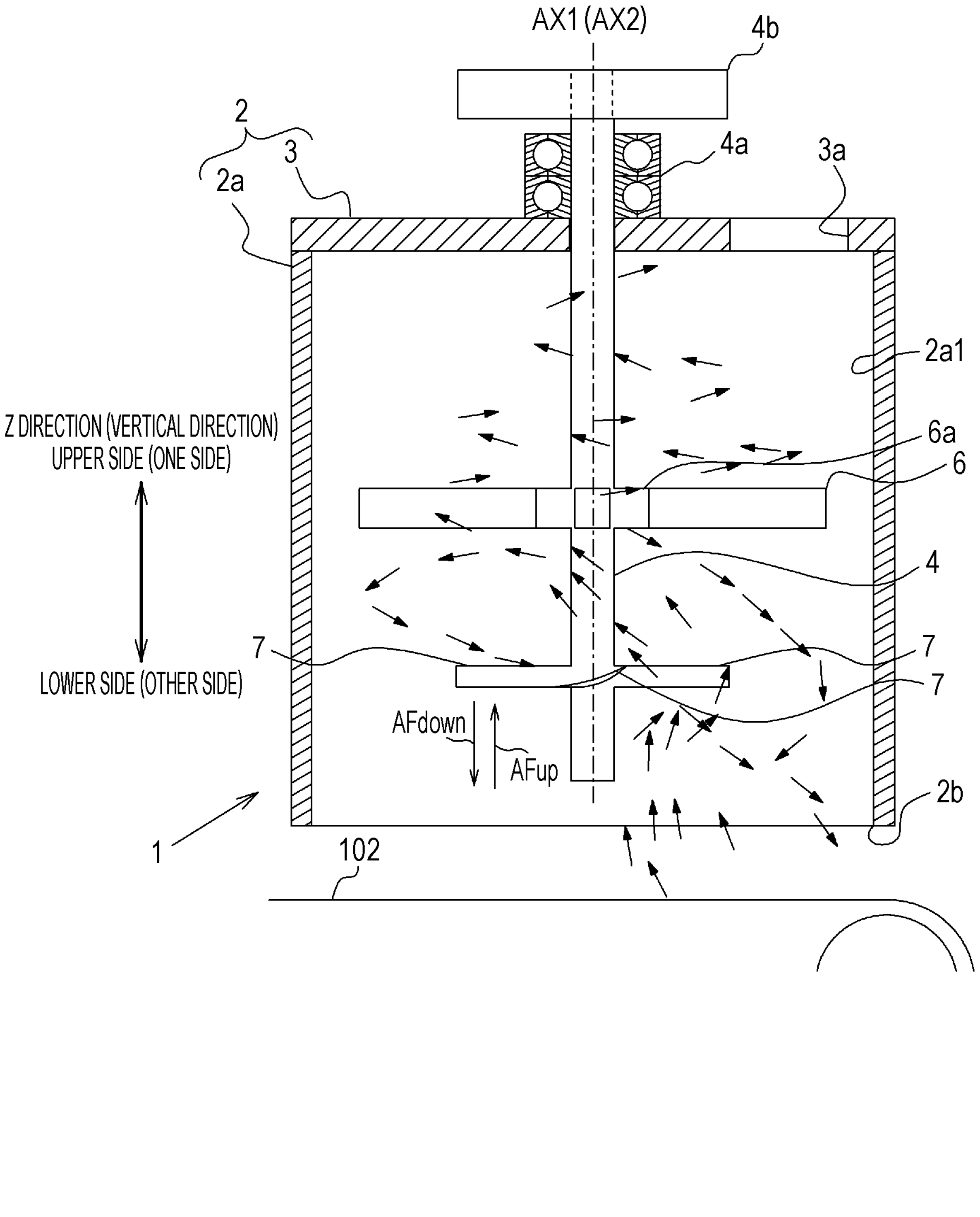
FIG. 6 is an explanatory view illustrating an example of a simulation result of a gas flow in the drum included in the rotary processing device according to the first embodiment.
Figure 7:
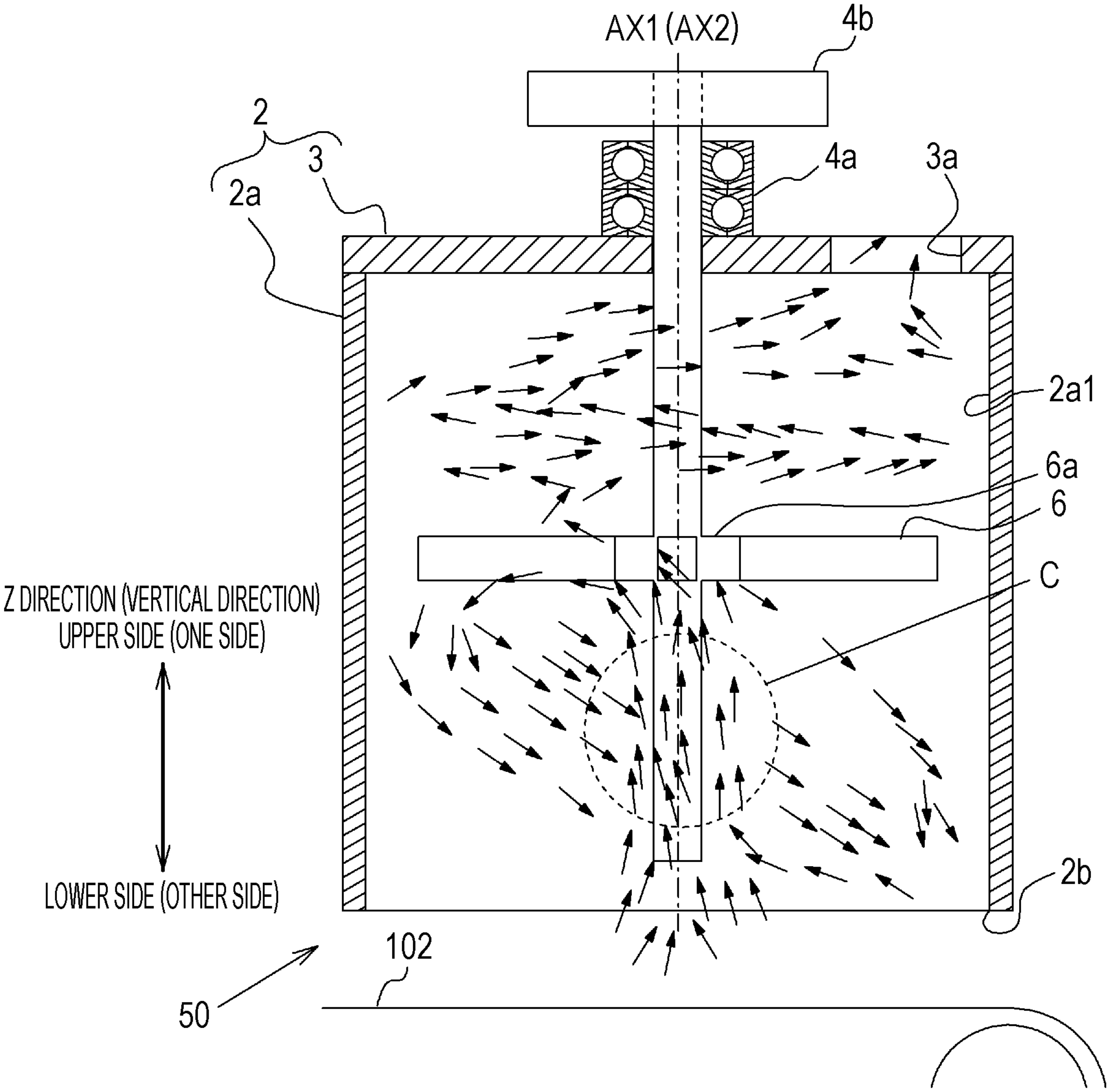
FIG. 7 is an explanatory view illustrating an example of a simulation result of a gas flow in the drum included in a rotary processing device according to a comparative example.

Here, the state of the gas flow in the drum 2 included in the processing device 1 of the embodiment will be described with reference to FIGS. 6 and 7. FIG. 6 is an example of a simulation result of the gas flow in the drum 2 included in the processing device 1 of the present embodiment, and FIG. 7 is an explanatory view illustrating an example of a simulation result of the gas flow in the drum 2 included in the processing device 50 of the comparative example. However, each simulation was performed using a model including a plurality of blades 6 instead of the impact member 5. The plurality of blades 6 are obtained by replacing each impact member 5, and the blades 6 are connected to the rotation axis member 4 via a hub portion 6*a* provided on the rotation axis member 4. While the impact member 5 in the embodiment has two stages, the blade 6 in this model has one stage.

First, the processing device 50 of the comparative example will be described. The processing device 50 of the comparative example is different from the processing device 1 of the present embodiment in that the blade portion 7 is not provided. Because the other points of the comparative example are not different from those of the processing device 1 of the present embodiment, the same reference numerals as those of the present embodiment are given to common components in the drawings, and a detailed description thereof will be omitted.

Referring to FIG. 7, as clearly illustrated in a region surrounded by reference numeral C in the drawing, when the processing device 50 was operated and the rotation axis member 4 to which the blade 6 was connected was rotated, a gas flow (upward flow) rising along the rotation axis member 4 was observed. Such an upward flow winds up fine particles such as additives and causes their scattering.

It is considered that the upward flow of the gas is generated due to the structure of the drum 2. The blade 6 connected to the rotation axis member 4 is provided in the drum 2. When this blade 6 is rotated, a swirling flow is generated in the drum 2. The swirling flow spreads along the inner peripheral wall 2*a*1 of the cylindrical portion 2*a* of the drum 2. Here, the drum 2 includes the feeding unit 3*a* of the raw material soil and the additive at the upper part and the discharge unit 2*b* at the lower part, and as described above, when comparing the areas thereof, the area of the discharge unit 2*b* is larger than the area of the feeding unit 3*a*. When the swirling flow is generated in the drum 2, a part of the swirling flow flows from the feeding unit 3*a* to the outside. When a part of the swirling flow flows out of the drum 2 from the feeding unit 3*a*, the swirling flow flows into the drum 2 from the discharge unit 2*b* to compensate the amount of gas flowing out. When the swirling flow flows out from a part having a small area, it is considered that the swirling flow is easily oriented. Therefore, it is considered that once such a gas flow occurs, the gas continuously flows from the discharge unit 2*b* into the drum 2, and a continuous upward flow toward the feeding unit 3*a* is generated.

It is considered that the upward flow generated in this manner mainly winds up the additive out of the raw material soil and the additive fed into the drum 2. This is because each grain of the additive is finer and lighter than the raw material soil. It is considered that the wound-up additive is discharged from the feeding unit 3*a* to the outside of the drum 2 along with the flow of gas and scattered. Scattering of the additive is considered to affect the operator and the surrounding environment. In addition, the additive is fed to the raw material soil at a desired ratio to obtain the reformed soil having desired properties and strength in consideration of the properties, amount, and the like of the raw material soil to be fed to the drum 2, but when scattering of the additive occurs, the additive is insufficient by that amount. As a result, there is a possibility that desired properties and strength cannot be obtained in the improved soil.

Next, a simulation result of the gas flow in the drum 2 in the processing device 1 of the present embodiment illustrated in FIG. 6 will be described. In the processing device 1 of the present embodiment, the blade portion 7 connected to the rotation axis member 4 rotates with the rotation of the rotation axis member 4, and accordingly, a downward gas flow (downward flow) is generated in the drum. This downward flow offsets the upward flow and suppresses the movement of gas in the drum 2. A state where the movement of the gas in the drum 2 is suppressed was also confirmed from the simulation result illustrated in FIG. 6. When the movement of the gas in the drum 2 is suppressed, winding up and scattering of fine particles such as additives are suppressed. When scattering of fine particles such as additives is suppressed, the influence on the operator and the surrounding environment can be alleviated. In addition, a predetermined amount of additive fed in consideration of the properties, amount, and the like of the raw material soil, which is a processing object, remains in the drum 2 and is mixed with the raw material soil. As a result, the improved soil having desired properties and strength can be obtained.

As described above, according to the processing device 1 of the present embodiment, it is possible to suppress scattering of particles (additives) in the processing device 1. Because the blade portion 7 is positioned below the impact member 5 and is provided near the discharge unit 2*b*, a gas flow that offsets a gas flow that tends to flow into the drum 2 from the discharge unit 2*b* can be generated. As a result, scattering of the additive can be effectively suppressed.

Second Embodiment

Figure 8A:
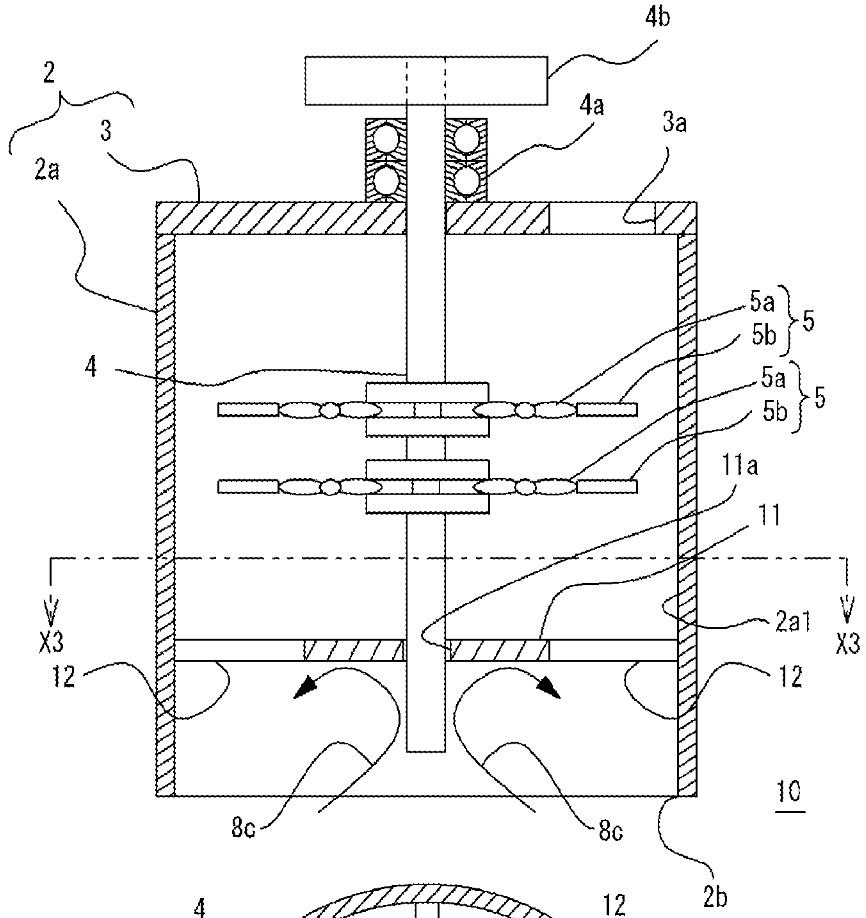
FIG. 8A is a sectional view taken in a rotation axis direction of a rotary processing device according to a second embodiment.
Figure 8B:
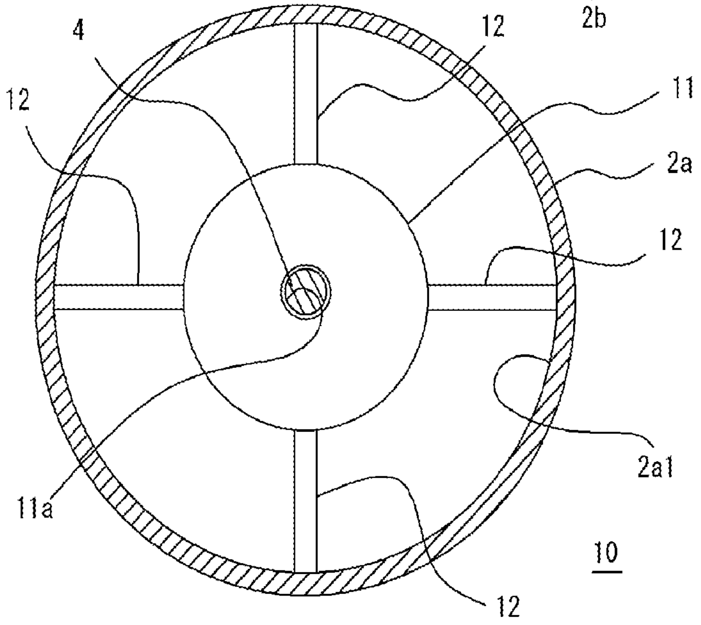
FIG. 8B is a sectional view taken along line X3-X3 in FIG. 8A.

Next, the processing device 10 according to a second embodiment will be described with reference to FIGS. 8A and 8B. FIG. 8A is a sectional view taken along the rotation axis direction of the processing device 10, and FIG. 8B is a sectional view taken along line X3-X3 in FIG. 8A. The processing device 10 of the second embodiment includes a plate-shaped portion 11 functioning as a suppression unit instead of the blade portion 7 included in the processing device 1 of the first embodiment. Because the other configurations are not different from those of the processing device 1 of the first embodiment, the same reference numerals are given to common components in the drawings, and the detailed description thereof will be omitted.

The plate-shaped portion 11 is provided on the other side of the impact member 5, that is, below the impact member 5. The plate-shaped portion 11 is a disk-shaped member that expands around the rotation axis member 4, An insertion hole 11*a* through which the rotation axis member 4 is inserted is provided at the center portion. The plate-shaped portion 11 is supported by the inner peripheral wall 2*a*1 of the cylindrical portion 2*a* of the drum 2 by the support unit 12. One end of the support unit 12 is fixed to the inner peripheral wall 2*a*1, the support unit 12 extends toward the center of the cylindrical portion 2*a*, and the other end of the support unit 12 is fixed to the plate-shaped portion 11. Thus, the plate-shaped portion 11 is installed in the drum 2. Therefore, even when the rotation axis member 4 rotates, the plate-shaped portion 11 itself does not rotate. In the present embodiment, the four support units 12 installed at 90° intervals support the plate-shaped portion 11, but the number of the support units 12 is not limited thereto and can be appropriately selected. It is preferable to use a metal material such as iron (for example, cast iron) or stainless steel because the raw material soil or the like pulverized by the impact member 5 hits the plate-shaped portion 11 and the support unit 12.

As indicated by an arrow 8*c* in FIG. 8A, a gas flow flowing from the discharge unit 2*b* into the cylindrical portion 2*a* of the drum 2 and about to rise collides with the plate-shaped portion 11. Then, the gas flow is bounced back to the plate-shaped portion 11 and is prevented from proceeding into the cylindrical portion 2*a*. As a result, movement of gas in the cylindrical portion 2*a* of the drum 2 is suppressed. Thus, winding up and scattering of fine particles such as additives are suppressed. Then, the influence of scattering of the additive on the operator and the surrounding environment is alleviated, and improved soil having desired properties and strength can be obtained. As illustrated in FIG. 8B, the support units 12 are installed at 90° intervals, and a substantially fan-shaped gap is formed between the support units 12. Because the processing object can fall through this gap, the support unit 12 does not hinder the falling of the processing object. In addition, because the lower side (the other end side) of the rotation axis member 4 is the free end, the size of the plate-shaped portion 11 can be increased as compared with the case where the bearing member is provided on the lower side (the other end side) of the rotation axis member 4, and the restriction on the shape is also reduced, and scattering of particles can be efficiently suppressed. In addition, because the degree of freedom of the installation position of the plate-shaped portion 11 in the Z direction is also increased, the plate-shaped portion 11 can be provided at an optimum position.

Although the case where the plate-shaped portion 11 in FIGS. 8A and 8B is a disk-shaped member has been described, the plate-shaped portion 11 is not limited thereto. For example, the plate-shaped portion 11 may be an umbrella-shaped member (or a conical or mountain-shaped member) that is inclined from the center portion to the peripheral edge portion. As a result, the processing object placed on the slope of the plate-shaped portion 11 can be easily dropped downward.

Third Embodiment

Figure 9A:
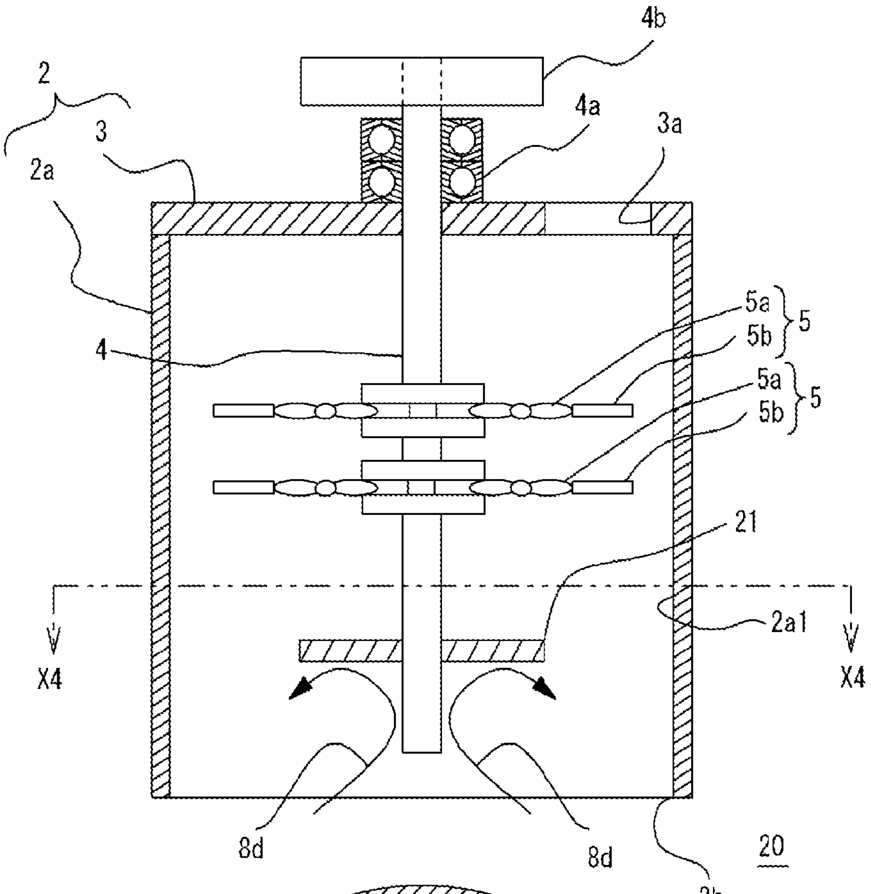
FIG. 9A is a sectional view taken in a rotation axis direction of a rotary processing device according to a third embodiment.
Figure 9B:
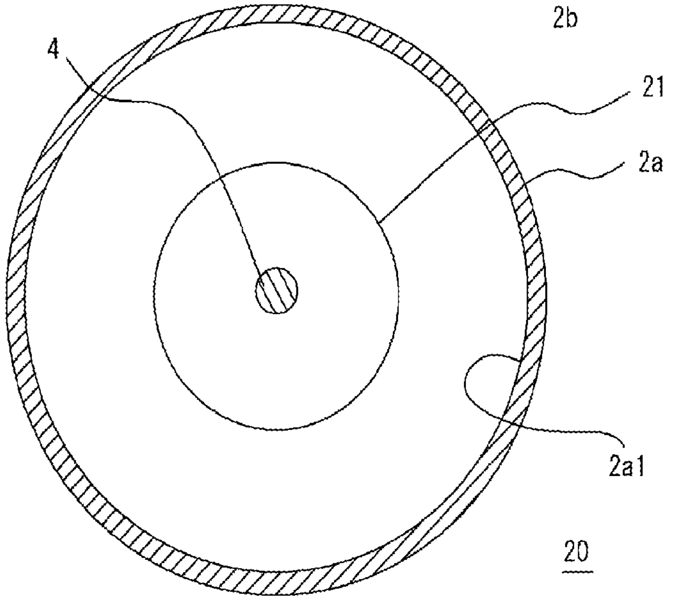
FIG. 9B is a sectional view taken along line X4-X4 in FIG. 9A.

Next, a processing device 20 according to a third embodiment will be described with reference to FIGS. 9A and 9B. FIG. 9A is a sectional view taken along the rotation axis direction of the processing device 20, and FIG. 9B is a sectional view taken along line X4-X4 in FIG. 9A. The processing device 20 of the third embodiment includes a plate-shaped portion 21 functioning as a suppression unit instead of the blade portion 7 included in the processing device 1 of the first embodiment. Because the other configurations are not different from those of the processing device 1 of the first embodiment, the same reference numerals are given to common components in the drawings, and the detailed description thereof will be omitted.

The plate-shaped portion 21 is provided on the other side of the impact member 5, that is, below the impact member 5. The plate-shaped portion 21 is connected to the rotation axis member 4. That is, while the plate-shaped portion 11 of the second embodiment is fixed to the inner peripheral wall 2*a*1 of the cylindrical portion 2*a* and the plate-shaped portion 11 itself does not rotate even when the rotation axis member 4 rotates, the plate-shaped portion 21 of the present embodiment rotates together with the rotation axis member 4.

As indicated by an arrow 8*d* in FIG. 9A, a gas flow flowing from the discharge unit 2*b* into the cylindrical portion 2*a* of the drum 2 and about to rise collides with the plate-shaped portion 21. Then, the gas flow is bounced back to the plate-shaped portion 21 and is prevented from proceeding into the cylindrical portion 2*a*. As a result, movement of gas in the cylindrical portion 2*a* of the drum 2 is suppressed. As a result, winding up and scattering of fine particles such as additives are suppressed. Then, the influence of scattering of the additive on the operator and the surrounding environment is alleviated, and improved soil having desired properties and strength can be obtained. As illustrated in FIG. 9B, because there is no structural portion between the plate-shaped portion 21 and the cylindrical portion 2*a* of the drum 2, the processing object can smoothly fall in the drum 2 below the impact member 5. In addition, because the lower side (the other end side) of the rotation axis member 4 is the free end, the size of the plate-shaped portion 21 can be increased as compared with the case where the bearing member is provided on the lower side (the other end side) of the rotation axis member 4, and the restriction on the shape is also reduced, and scattering of particles can be efficiently suppressed. In addition, because the degree of freedom of the installation position of the plate-shaped portion 21 in the Z direction is also increased, the plate-shaped portion 21 can be provided at an optimum position. It is preferable to use a metal material such as iron (for example, cast iron) or stainless steel because the raw material soil or the like pulverized by the impact member 5 hits the plate-shaped portion 21.

Also in the third embodiment, the plate-shaped portion 21 may be an umbrella-shaped member (or a conical or mountain-shaped member) that is inclined from the center portion to the peripheral edge portion.

Fourth Embodiment

Figure 10:
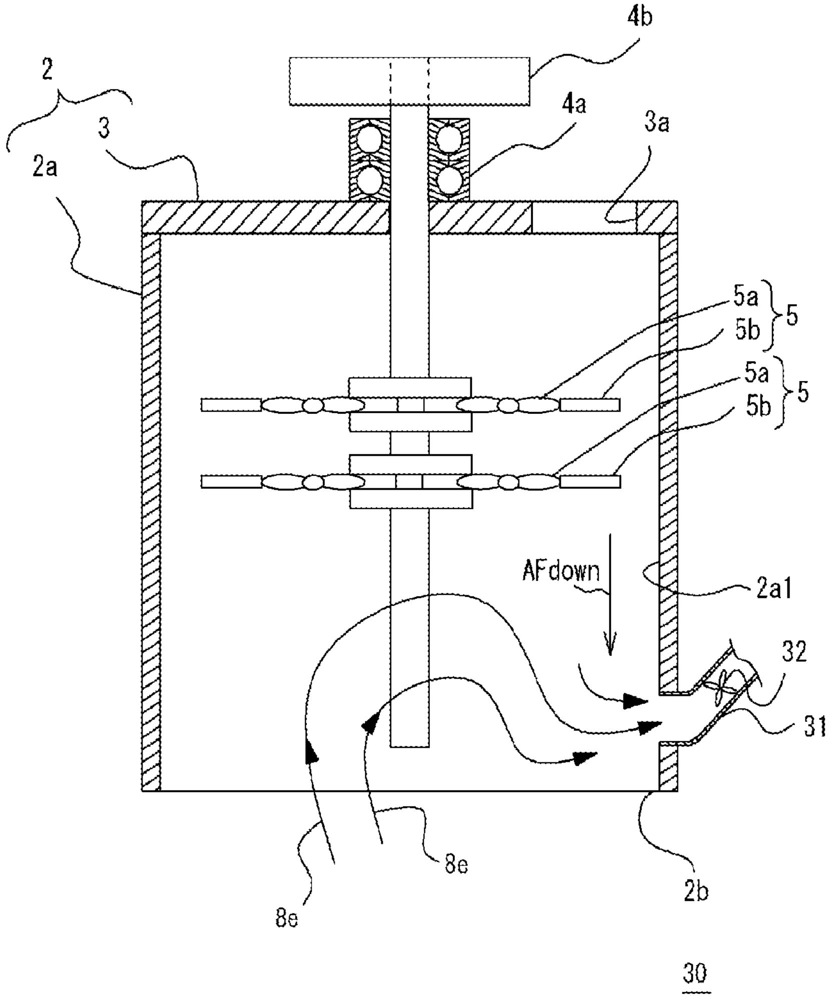
FIG. 10 is a sectional view illustrating the inside of a drum of a rotary processing device according to a fourth embodiment and an exhaust duct connected to the drum.

Next, a processing device 30 according to a fourth embodiment will be described with reference to FIG. 10. The processing device 30 of the fourth embodiment includes an exhaust duct 31 functioning as a suppression unit and an exhaust fan 32 incorporated in the exhaust duct 31 instead of the blade portion 7 included in the processing device 1 of the first embodiment. Because the other configurations are not different from those of the processing device 1 of the first embodiment, the same reference numerals are given to common components in the drawings, and the detailed description thereof will be omitted.

The exhaust duct 31 is connected to the cylindrical portion 2*a* of the drum 2, but is positioned below the impact member 5, specifically, in the vicinity of the discharge unit 2*b* of the cylindrical portion 2*a*. The exhaust fan 32 is installed to suck the gas (e.g., air) in drum 2 through exhaust duct 31. The movement of the gas in the drum 2 can be suppressed by operating the exhaust fan 32 when the impact member 5 connected to the rotation axis member 4 is rotated. When the exhaust fan is operated while the impact member 5 is rotating, as indicated by arrow 8*e* in FIG. 10, a gas flow that is about to rise along the rotation axis member 4 changes the direction thereof and is sucked into the exhaust duct 31. That is, the upward gas flow generated by the rotation of the impact member 5 is offset by the downward gas flow by the operation of the exhaust fan 32, and accordingly, the movement of the gas is suppressed. As a result, movement of gas in the cylindrical portion 2*a* of the drum 2 is suppressed. Thus, winding up and scattering of the additive are suppressed. Then, the influence of scattering of the additive on the operator and the surrounding environment is alleviated, and improved soil having desired properties and strength can be obtained.

According to the processing device disclosed in the present specification, because the suppression unit that suppresses the gas flow from the other part toward one part in the drum 2 is provided, the scattering of the particles can be suppressed. As a result, the influence of scattering of the additive on the operator and the surrounding environment is alleviated, and improved soil having desired properties and strength can be obtained.

Because the plate-shaped portion functioning as the suppression unit and the exhaust duct are provided below the impact member 5 corresponding to the processing member, these members do not interfere with the processing of the processing object by the impact member 5. In addition, because the blade portion 7, the plate-shaped portions 11 and 21, and the exhaust duct 31 functioning as a suppression unit is positioned below the impact member 5 and is provided near the discharge unit 2*b*, a gas flow that offsets a gas flow that tends to flow into the drum 2 from the discharge unit 2*b* is generated. Accordingly, it is possible to effectively suppress scattering of the additive.

The above-described embodiments are preferred examples of the present invention. However, the present invention is not limited thereto, and various modifications can be made without departing from the gist of the present invention. In any of the embodiments described above, the rotation axis member 4 is rotatably supported at the upper end portion around the rotation axis AX2, and the lower end portion is a free end. However, the rotation axis member 4 may be rotatably supported at the lower end portion. For example, in the case of adopting an aspect in which the rotation axis member 4 is inserted through the insertion hole 11*a* provided at the center portion and is supported by the inner peripheral wall 2*a*1 of the cylindrical portion 2*a* of the drum 2 by the support unit 12 as in the second embodiment, the insertion hole 11*a* may have a bearing structure. Thus, the rotation axis member 4 is rotatably supported with respect to the drum 2. Alternatively, the rotation axis member 4 may be rotatably supported at both the upper end portion and the lower end portion.

The cross-sectional shape of the plate-shaped portions 11 and 21 is not limited to a rectangular shape. The plate-shaped portions 11 and 21 may be any shape such as an elliptical shape, a triangular shape, or an inverted triangular shape, and may be a cross-sectional shape that efficiently suppresses scattering of particles. In addition, a mechanical component such as a gear may be interposed between the rotation axis member 4 and the blade portion 7 to connect the rotation axis member 4 and the blade portion 7, and the rotation direction of the rotation axis member 4 and the rotation direction of the blade portion 7 may be different from each other. Similarly, a mechanical component such as a gear may be interposed between the rotation axis member 4 and the plate-shaped portion 21 to connect the rotation axis member 4 and the plate-shaped portion 21, and the rotation direction of the rotation axis member 4 and the rotation direction of the plate-shaped portion 21 may be different from each other.

Modification Example 1

Figure 11:
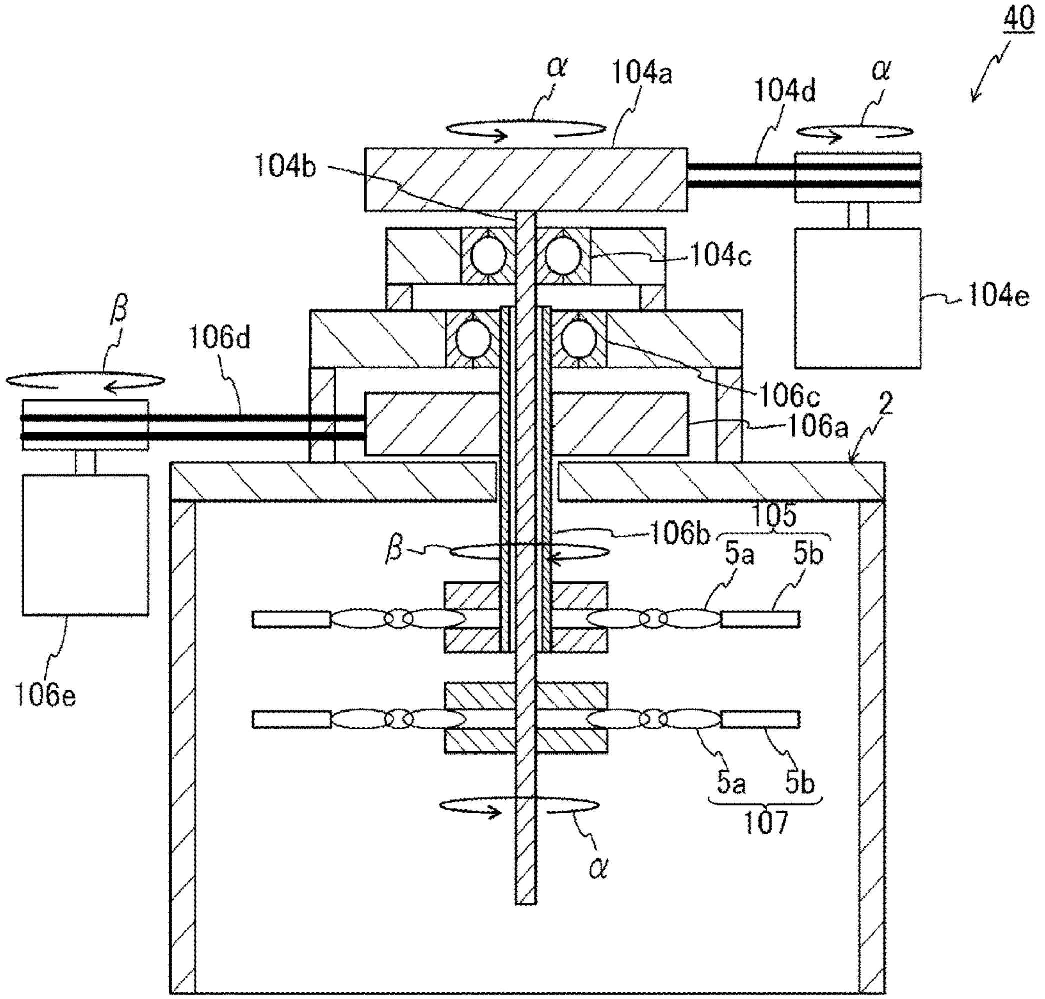
FIG. 11 is a sectional view of a rotary processing device according to Modification Example 1.

FIG. 11 is a schematic sectional view of a processing device 40 according to Modification Example 1. As illustrated in FIG. 11, the processing device 40 includes the drum 2, a first rotation axis member 104*b*, a second rotation axis member 106*b*, and impact members 105 and 107. Although the drum 2 has a complicated shape (substantially three-step shape) in terms of holding bearing members 104*c* and 106*c*, the shape of the drum 2 is not limited to the shape in FIG. 11.

The first rotation axis member 104*b* is a rod-shaped member extending in the up-and-down direction. The first rotation axis member 104*b* is rotatably supported by the bearing member 104*c* provided on the drum 2. A driving pulley 104*a* is provided at the upper end portion of the first rotation axis member 104*b*. A driving belt 104*d* is stretched over the driving pulley 104*a*, and the driving belt 104*d* transmits the rotation of a first driving motor (first rotation driving device) 104*e* to the driving pulley 104*a* to rotate the first rotation axis member 104*b*. Stated differently, a first rotation driving device rotationally drives the first rotation axis member 104*b*. The impact member 107 is provided on the lower end portion side of the first rotation axis member 104*b*. The configuration of the impact member 107 is similar to that of the impact member 5 of the first embodiment.

In the present Modification Example 1, when the first driving motor 104*e* rotates in the direction of arrow α, the driving pulley 104*a*, the first rotation axis member 104*b*, and the impact member 107 rotate in the direction of arrow α.

The second rotation axis member 106*b* is a cylindrical member extending in the up-and-down direction. The second rotation axis member 106*b* is provided outside the first rotation axis member 104*b*. The second rotation axis member 106*b* is rotatably supported by the bearing member 106*c* provided on the drum 2. The second rotation axis member 106*b* is provided with a driving pulley 106*a*. A driving belt 106*d* is stretched over the driving pulley 106*a*, and the driving belt 106*d* transmits the rotation of a second driving motor (second rotation driving device) 106*e* to the driving pulley 106*a* to rotate the second rotation axis member 106*b*. Stated differently, a second rotation driving device rotationally drives the second rotation axis member 106*b*. The impact member 105 is provided on the lower end portion side of the second rotation axis member 106*b*. The configuration of the impact member 105 is similar to that of the impact member 5 of the first embodiment.

Together, the first and second rotation driving devices form a driving mechanism that rotationally drives the first rotation axis member 104*b* and the second rotation axis member 106*b*.

In the present Modification Example 1, when the second driving motor 106*e* rotates in the direction of arrow β (a direction opposite to the direction arrow α), the driving pulley 106*a*, the second rotation axis member 106*b*, and the impact member 105 rotate in the direction of arrow β. In the present Modification Example 1, the rotating speeds of the impact member 105 and the impact member 107 are the same.

In the present Modification Example 1, because the rotation directions of the impact member 105 and the impact member 107 are opposite directions and the rotating speeds are the same, the flow of wind generated by the rotation of the impact member 105 is offset by the rotation of the impact member 107. That is, an upward flow (refer to FIG. 7) generated by rotating the impact member 105 and winding up or scattering of fine particles such as an additive generated by the upward flow can be offset by a downward flow generated by rotating the impact member 107. As a result, winding up and scattering of fine particles such as an additive in the drum 2 are suppressed, and thus the influence on the operator and the surrounding environment can be alleviated. In addition, because a predetermined amount of additive fed in consideration of the properties, amount, and the like of the raw material soil, which is a processing object, remains in the drum 2 and is mixed with the raw material soil, it is possible to obtain improved soil having desired properties and strength.

As described above, in the present Modification Example 1, the impact member 107 that is connected to the first rotation axis member 104*b* and rotates in the direction opposite to the impact member 105 to crush the raw material soil functions as a suppression unit that suppresses the occurrence of the upward flow in the drum 2.

In addition, in the present Modification Example 1, by making the rotation directions of the impact member 105 and the impact member 107 opposite to each other, the impact member 107 applies a force in the α direction to a processing object subjected to a force in the β direction from the impact member 105. As a result, the impact force applied to the processing object by the impact member 107 increases, and thus the crushing efficiency of the processing object can be improved.

In addition, in the present Modification Example 1, the case where the rotating speeds of the impact member 105 and the impact member 107 are the same has been described, but the present invention is not limited thereto, and the rotating speeds of the impact member 105 and the impact member 107 may be different from each other. For example, the rotating speeds of the impact member 105 and the impact member 107 may be determined such that the occurrence of the upward flow is more effectively suppressed based on an experiment, a simulation result, or the like.

Modification Example 2

Figure 12:
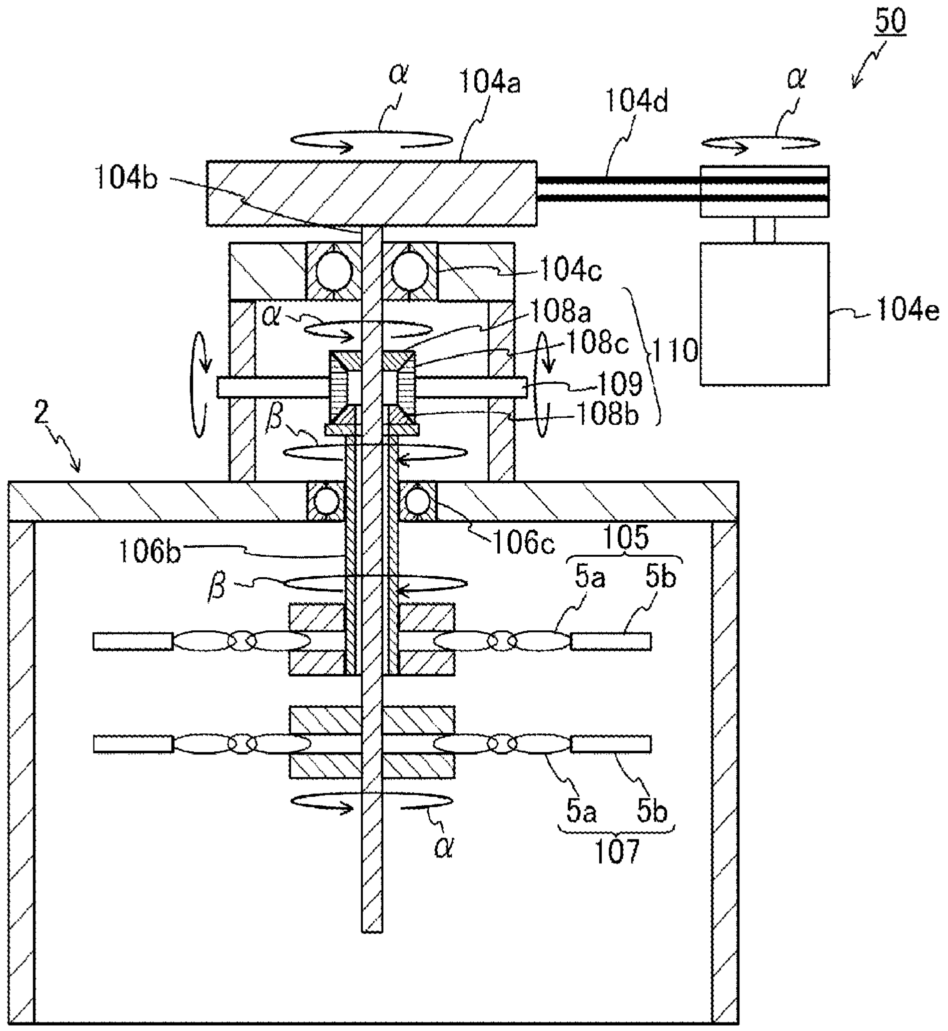
FIG. 12 is a sectional view of a rotary processing device according to Modification Example 2.

FIG. 12 is a schematic sectional view of the processing device 50 according to Modification Example 2. As illustrated in FIG. 12, the processing device 50 includes the drum 2, the first rotation axis member 104*b*, the second rotation axis member 106*b*, a transmission mechanism 110, and the impact members 105 and 107.

The first rotation axis member 104*b* is a rod-shaped member extending in the up-and-down direction. The first rotation axis member 104*b* is rotatably supported by the bearing member 104*c* provided on the drum 2. A driving pulley 104*a* is provided at the upper end portion of the first rotation axis member 104*b*. The driving belt 104*d* (first transmission unit) is stretched over the driving pulley 104*a*, and the driving belt 104*d* transmits the rotation of the driving motor (rotation driving device) 104*e* to the driving pulley 104*a* to rotate the first rotation axis member 104*b*. The impact member 107 is provided on the lower end portion side of the first rotation axis member 104*b*. The configuration of the impact member 107 is similar to that of the impact member 5 of the first embodiment.

In the present Modification Example 2, when the driving motor 104*e* rotates in the direction of arrow α, the driving pulley 104*a*, the first rotation axis member 104*b*, and the impact member 107 rotate in the direction of arrow α.

The second rotation axis member 106*b* is a cylindrical member extending in the up-and-down direction. The second rotation axis member 106*b* is provided outside the first rotation axis member 104*b*. The second rotation axis member 106*b* is rotatably supported by the bearing member 106*c* provided on the drum 2. The impact member 105 is provided on the lower end portion side of the second rotation axis member 106*b*. The configuration of the impact member 105 is similar to that of the impact member 5 of the first embodiment.

The transmission mechanism 110 functions as a second transmission unit that receives rotation of the first rotation axis member 104*b* and transmits the rotation driving force in a direction opposite to the first rotation axis member 104*b* to the second rotation axis member 106*b*. The transmission mechanism 110 includes a first gear 108*a* that is fixed to the first rotation axis member 104*b* and rotates together with the first rotation axis member 104*b*, a second gear 108*b* that is fixed to the upper end portion of the second rotation axis member 106*b* and rotates together with the second rotation axis member 106*b*, and a plurality of (two in FIG. 12) third gears 108*c* provided between the first gear 108*a* and the second gear 108*b*.

The first gear 108*a* is a bevel gear and meshes with the third gear 108*c*. The second gear 108*b* is a bevel gear provided vertically symmetrically with the first gear 108*a*, and the second gear 108*b* meshes with the third gear 108*c*. The second gear 108*b* is provided with a through-hole penetrating in the up-and-down direction at the center portion to not contact the first rotation axis member 104*b*. The third gear 108*c* is also a bevel gear and is pivotally supported by the drum 2 via a shaft 109. The rotation axis of the third gear 108*c* extends in the horizontal direction and is orthogonal to the rotation axes of the first and second gears 108*a* and 108*b*.

In the transmission mechanism 110, when the first rotation axis member 104*b* rotates in the α direction, the first gear 108*a* also rotates in the α direction, and the rotational force thereof is transmitted to the third gear 108*c*. As a result, the third gear 108*c* rotates about the shaft 109. The rotational force of the third gear 108*c* is transmitted to the second gear 108*b*, and accordingly, the second gear 108*b* rotates in the opposite direction (β direction) to the first gear 108*c*. In the present Modification Example 2, the number of teeth of the first gear 108*a* and the number of teeth of the second gear 108*b* are the same, and the rotating speeds of the first rotation axis member 104*b* (impact member 107) and the second rotation axis member 106*b* (impact member 105) are the same.

In the present Modification Example 2, similar to the above Modification Example 1, because the rotation directions of the impact member 105 and the impact member 107 are opposite directions, the flow of wind generated by the rotation of the impact member 105 is offset by the rotation of the impact member 107. As a result, similarly to the Modification Example 1, it is possible to suppress winding up and scattering of fine particles such as an additive in the drum 2. As described above, in the present Modification Example 2, the impact member 107 that is connected to the first rotation axis member 104*b* and rotates in the direction opposite to the impact member 105 to crush the raw material soil functions as a suppression unit that suppresses the occurrence of the upward flow in the drum 2.

In addition, in the present Modification Example 2, by making the rotation directions of the impact member 105 and the impact member 107 opposite to each other, the impact member 107 applies a force in the α direction to a processing object subjected to a force in the β direction from the impact member 105. As a result, the impact force applied to the processing object by the impact member 107 increases, and thus the crushing efficiency of the processing object can be improved.

In addition, in the present Modification Example 2, the case where the rotating speeds of the impact member 105 and the impact member 107 are the same has been described, but the present invention is not limited thereto, and the rotating speeds of the impact member 105 and the impact member 107 may be different from each other. When the rotating speeds are made different, the number of teeth of the first gear 108*a* and the number of teeth of the second gear 108*b* may be made different.

In the above Modification Example 1, the case where the rotary motor 104*e* rotates the first rotation axis member 104*b* has been described, but the present invention is not limited thereto, and the second rotation axis member 106*b* may be rotated. In this case, because the rotational force of the second rotation axis member 106*b* is transmitted to the first rotation axis member 104*b* via the transmission mechanism 110, the first rotation axis member 104*b* rotates in a direction opposite to the second rotation axis member 106*b*.

In the drum 2 of the above Modification Examples 1 and 2, the blade portion 7 similar to that of the first embodiment, the plate-shaped portions 11 and 21 of the second and third embodiments, and the exhaust duct 31 of the fourth embodiment may be provided as necessary.

A List of Reference Signs Used in the Drawings and Specification are Listed Below

1, 10, 20, 30 Rotary processing device
2 Drum
2*a* Cylindrical portion
2*a*1 Inner peripheral wall
2*b* Discharge unit
3 Top plate portion
3*a* Feeding unit
4 Rotation axis member
4*a* Bearing member
5 Impact member
7 Blade portion
11, 21 Plate-shaped portion
11*a* Insertion hole
12 Support unit
31 Exhaust duct
32 Exhaust fan
100 Mixing device
101 Feeding conveyor
102 Discharge conveyor
104*b* First rotation axis member
104*d* Driving belt
104*e* First driving motor, driving motor
106*b* Second rotation axis member
106*e* Second driving motor
105,107 Impact member
110 Transmission mechanism
AX2 Rotation axis

The invention claimed is:

1. A rotary processing system, comprising:
a particulate additive;
a drum including a feeding unit for feeding a processing object including soil and the particulate additive on one side of the drum and a discharger for discharging the processing object on an other side of the drum;
a processor that is connected to a rotation axis member, rotates about a rotation axis of the rotation axis member, and mixes the soil and the particulate additive in the drum; and
a suppressor that suppresses a release of particles of the particulate additive in the drum through the feeding unit caused by rotation of the processor, wherein the suppressor extends in a radial direction away from the rotation axis towards a radially-outer end of the suppressor that is spaced apart from an inner peripheral wall of the drum, and a length of the suppressor in the radial direction is shorter than a length of the processor in the radial direction.

2. The rotary processing system according to claim 1, wherein the suppressor is connected to the rotation axis member below the processor and generates a gas flow toward the other side of the drum by rotation of the rotation axis member.

3. The rotary processing system according to claim 1, wherein the suppressor includes a plate-shaped portion disposed below the processor and against which a gas flow from the other side of the drum toward the one side in the drum collides.

4. The rotary processing system according to claim 3, wherein the plate-shaped portion expands around the rotation axis member and is supported by a support unit extending from the inner peripheral wall of the drum.

5. The rotary processing system according to claim 1, wherein the rotation axis member is held by the drum while penetrating a top plate portion included in the drum and being rotatable via a bearing member provided in a vicinity of the top plate portion, and an end portion of the rotation axis member positioned inside the drum is a free end.

6. The rotary processing system according to claim 1, wherein a rotation direction of the rotation axis member is different than a rotation direction of the suppressor.

7. The rotary processing system according to claim 1, wherein the suppressor is connected to the rotation axis member, rotates in a direction opposite to the processor, and mixes the processing object in the drum.

8. The rotary processing system according to claim 7, wherein the rotation axis member includes a first rotation axis member to which the suppressor is connected, and a substantially cylindrical second rotation axis member provided outside the first rotation axis member, and the rotary processing system includes a driving mechanism that rotationally drives the first rotation axis member and the second rotation axis member.

9. The rotary processing system according to claim 2, wherein the rotation axis member is held by the drum while penetrating a top plate portion included in the drum and being rotatable via a bearing member provided in a vicinity of the top plate portion, and an end portion of the rotation axis member positioned inside the drum is a free end.

10. The rotary processing system according to claim 2, wherein a rotation direction of the rotation axis member is different than a rotation direction of the suppressor.

11. The rotary processing system according to claim 1, wherein a width of the suppressor in an axial direction is entirely enclosed by the inner peripheral wall of the drum.

12. The rotary processing system according to claim 1, wherein the rotation axis member is rotatable via a bearing member, and the length of the suppressor in the radial direction is longer than a length of the bearing member in the radial direction.

13. The rotary processing system according to claim 1, wherein the processor comprises a first portion having a fixed radius about the rotation axis member and a second portion comprising at least two spaced-apart portions affixed to and extending radially away from the first portion, and the length of the suppressor in the radial direction is longer than a diameter of the first portion.

14. The rotary processing system according to claim 1, wherein an area of the discharger is larger than an area of the feeding unit.

15. The rotary processing system according to claim 1, wherein the suppressor is rotatable at a rotational speed, wherein the rotational speed of the suppressor is predetermined such that the release of the particulate additive through the feeding unit is suppressed.

16. The rotary processing system according to claim 1, wherein the processor is connected to the rotation axis member by a hub having a hub length extending radially outward from the rotation axis member; and the length of the suppressor in the radial direction is longer than the hub length.

17. A rotary processing system, comprising:

a particulate additive;

a drum including a feeding unit for a processing object including a soil and the particulate additive on one side of the drum and a discharger for the processing object on an other side of the drum;

a processor that is connected to a rotation axis member, rotates about a rotation axis of the rotation axis member, and mixes the soil and the particulate additive in the drum; and a suppressor that suppresses a release of particles of the particulate additive in the drum through the feeding unit caused by the rotation of the processor, wherein the suppressor includes a blade that generates a downward gas flow toward the discharger.

18. The rotary processing system according to claim 17, wherein an area of the discharger is larger than an area of the feeding unit.

19. The rotary processing system according to claim 17, wherein a rotational speed of the blade is predetermined such that the release of the particles of the particulate additive through the feeding unit is suppressed.

20. The rotary processing system according to claim 17, wherein the blade has a curved shape in a horizontal plane.

* * * * *